United States Patent [19]
Loposer

[11] Patent Number: 5,230,085
[45] Date of Patent: Jul. 20, 1993

[54] METHOD AND APPARATUS FOR WIRELESS ELECTROMAGNETIC COMMUNICATION WITHIN A CONTAINED ELECTROMAGNETIC FIELD

[75] Inventor: Thomas L. Loposer, Greenville, Tex.
[73] Assignee: E-Systems, Inc., Dallas, Tex.
[21] Appl. No.: 680,743
[22] Filed: Apr. 5, 1991
[51] Int. Cl.$^5$ .......................... H04B 3/60; H04B 5/02
[52] U.S. Cl. ........................... 455/41; 455/55.1; 379/55; 333/245; 343/705; 343/711
[58] Field of Search ............... 333/236, 237, 240, 245; 343/705, 711, 719, 905; 455/41, 55, 14, 15; 379/55

[56] References Cited

U.S. PATENT DOCUMENTS

| | | | |
|---|---|---|---|
| 2,478,133 | 8/1949 | Shanklin | 333/237 X |
| 2,628,275 | 2/1953 | Parker | 379/55 X |
| 3,191,122 | 6/1965 | Hussey | 343/719 X |
| 3,290,626 | 6/1966 | Hafner | 379/55 X |
| 3,803,366 | 4/1974 | Ishii et al. | 455/55 X |
| 4,352,200 | 9/1982 | Oxman | 455/41 |
| 4,428,078 | 1/1984 | Kuo | 455/41 X |
| 4,605,916 | 8/1986 | Tehori | 333/245 |
| 4,736,452 | 4/1988 | Daniels et al. | 455/41 |
| 4,932,006 | 6/1990 | Delignieres | 455/41 X |
| 4,941,270 | 7/1990 | Maeda et al. | 455/41 X |

FOREIGN PATENT DOCUMENTS

| | | | |
|---|---|---|---|
| 00774409 | 7/1978 | Japan . | |
| 220531 | 9/1986 | Japan | 379/55 |
| 42427 | 10/1987 | Japan | 455/55 |
| 2160074 | 12/1985 | United Kingdom | 455/14 |

OTHER PUBLICATIONS

Stolarczyk, Larry G.; "The design of a cellular MF radio communication system for underground Mining"; 1980 *IEEE Nat'l. Telecomm Conf;* Houston, Tex.; Nov. 30–Dec. 4, 1980; pp. 93.1–93.5.

Primary Examiner—Robert J. Pascal
Assistant Examiner—Benny T. Lee
Attorney, Agent, or Firm—Harold E. Meier

[57] ABSTRACT

Wireless electromagnetic communication between a primary transceiver and one or more secondary transceivers located within an enclosed structure may be effectuated by forming a multi-conductor electromagnetic transmission line within the structure. Communications are effectuated by utilizing the enclosing structure itself as one conductor in a multi-conductor transmission line. One or more other conductors are then placed within and insulated from the structure to complete the communications transmission line. A primary communications transceiver and a matched terminating load are connected to the ends of the transmission line to form a contained electromagnetic field. Use of a matched terminating load minimizes standing waves and provides for substantially constant electromagnetic field strength within the structure. Each secondary transceiver located within the contained electromagnetic field communicates with other secondary transceivers or the primary transceiver by inserting or extracting electromagnetic energy from the transmission line.

12 Claims, 2 Drawing Sheets

METHOD AND APPARATUS FOR WIRELESS ELECTROMAGNETIC COMMUNICATION WITHIN A CONTAINED ELECTROMAGNETIC FIELD

TECHNICAL FIELD

This invention relates to wireless electromagnetic communications within a contained electromagnetic field and in particular to a wireless broadband electromagnetic communication system utilizing an enclosing structure as one conductor in a broadband multi-conductor communications transmission line.

BACKGROUND OF THE INVENTION

It is well known that electronic equipment tends to emit electromagnetic energy during operation. It is also well known that effective operation of electronic equipment can be jeopardized by ambient electromagnetic energy emitted by other electronic devices positioned nearby. This is commonly called electromagnetic interference. In both civilian and military applications, a set of electromagnetic interference criteria have been developed and specified to define electromagnetic emission restraints and acceptable levels of electromagnetic emissions susceptibility.

Historically, continued electromagnetic interference difficulties have caused the adoption of system design practices that dictate the use of shielded cabling between system components to insure minimal emission of electromagnetic energy and interference with other proximately located system components during data transfer operations. Use of this method of electromagnetic interference reduction requires significant amounts of inter-system component cabling installed at considerable cost. Inter-system component cabling also occupies valuable space in and adds unnecessary weight to the system. This can pose significant problem with system component placement in space and weight sensitive applications, for example, military aircraft.

Advances in communications technology now provide for reliable wireless signal transmission and reception at electromagnetic signal field strengths significantly below the established electromagnetic interference criteria. Thus, data transmission between system components may be accomplished without using expensive inter-system component cabling. However, these advances in communications technology have not completely solved the electromagnetic field and interference problems associated with system component communications.

As is well known, the electromagnetic field emitted by wireless transceivers or other individual system components within the confined system area tends to bounce and reflect off nearby structures having electromagnetic wave reflective characteristics creating a contained electromagnetic field. The combination of direct and reflected electromagnetic energy within the contained electromagnetic field creates standing electromagnetic waves that exhibit widely differing field strengths throughout the confined system area. Efficient and effective wireless data transmission to individual system components positioned in areas of low electromagnetic field strength (dead zones) is therefore difficult, if not impossible. Furthermore, movement of reflective structures within the confined system area changes the reflected energy paths and alters the standing wave pattern and locations where dead zones are encountered. Thus, it is not feasible to permanently position individual system components within the confined system area as it is impossible to adequately predict and insure necessary electromagnetic field strengths at a given location within a contained electromagnetic field.

Accordingly, there is a need for a less expensive and more predictable method for transmitting data by electromagnetic radiation within an enclosed area defining a contained electromagnetic field.

SUMMARY OF THE INVENTION

The present invention provides a solution to the foregoing standing wave problems associated with data transmission utilizing electromagnetic transceivers by providing, within an enclosed area, a matched, wireless electromagnetic transmission line for system component data communications. In accordance with the broader aspects of the present invention, the structure defining the enclosed area acts as one conductor in a multi-conductor communications transmission line. At one end of the transmission line, a primary radio frequency transceiver is coupled to the transmission line. The other end of the transmission line is terminated by a matched load impedance.

The use of a matched load to terminate the transmission line provides for standing electromagnetic wave levels of nominal amplitude with relatively constant electromagnetic field strength throughout the enclosed field area. This allows secondary transceivers placed within the contained electromagnetic field to communicate over the transmission line with the primary transceiver. If the transmission line is properly matched, the introduction of relatively small reflective bodies, such as secondary transceivers or other equipment, into the contained electromagnetic field will not adversely affect system component communication by magnifying standing wave amplitudes and creating dead zones.

In one particular application of the present invention, the fuselage of an aircraft is used as the outer conductor for a two-conductor electromagnetic communications transmission line. An inner conductor is positioned within and spans the length of the fuselage (outer conductor). A primary radio frequency transceiver is connected to one end of the transmission line and a matched terminating impedance is coupled to the other end. Use of a matched load impedance results in minimal electromagnetic field reflections within the contained electromagnetic field and insures reasonable standing wave levels throughout the fuselage. Communication within the fuselage is accomplished by placing individual secondary transceivers within the fuselage/transmission line to insert or extract energy from the contained electromagnetic field and communicate with the primary radio frequency transceiver.

The method for electromagnetic communications within a contained electromagnetic field may be adapted to provide efficient wireless electromagnetic communications within any confined area that may act as an outer conductor in a multi-conductor transmission line. For example, the method of the present invention can be used to provide a contained electromagnetic communications field within a submarine, ship, railroad car, or command control and communications center. Other advantages and applications deriving from the use of the invention will readily suggest themselves to those skilled in the art from consideration of the following Detailed Description taken in conjunction with the accompanying Drawings.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION OF THE DRAWINGS

Figure 1:
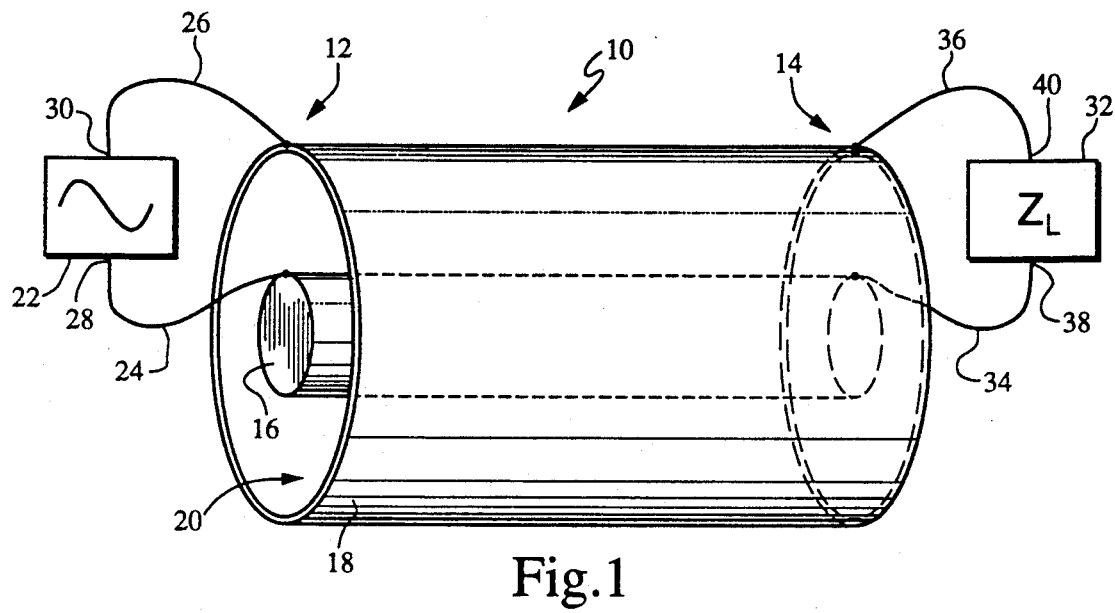
FIG. 1 is a finite two-conductor coaxial transmission line coupled to a sinusoidal generator and terminated by a load impedance.

Referring now to FIG. 1, there is shown a two-conductor coaxial transmission line 10 having a first end 12 and a second end 14. The coaxial transmission line 10 is comprised of an inner conductor 16 and an outer conductor 18. Between the inner and outer conductors, 16 and 18 respectively, is a dielectric material 20. In the preferred embodiment of the present invention, the dielectric material 20 comprises air to allow for insertion of materials between the inner and outer conductors.

A sinusoidal voltage source 22 is coupled to the first end 12 of transmission line 10 by means of a pair of leads 24 and 26. Lead 24 connects a first pole 28 of the sinusoidal voltage source 22 to the inner conductor 16. Lead 26 connects a second pole 30 of the sinusoidal voltage source 22 to the outer conductor 18. The sinusoidal voltage source 22 preferably comprises a primary radio frequency transceiver for communication over the transmission line 10 to secondary transceivers placed in the dielectric 20. The second end 14 of transmission line 10 is terminated by a load impedance ($Z_l$) 32. Terminating load impedance 3 is coupled to the transmission line 10 by means of a pair of leads 34 and 36. Lead 34 connects a first pole 38 of impedance 32 to the inner conductor 16. Lead 36 connects a second pole 40 of impedance 32 to the outer conductor 18.

Figure 2:
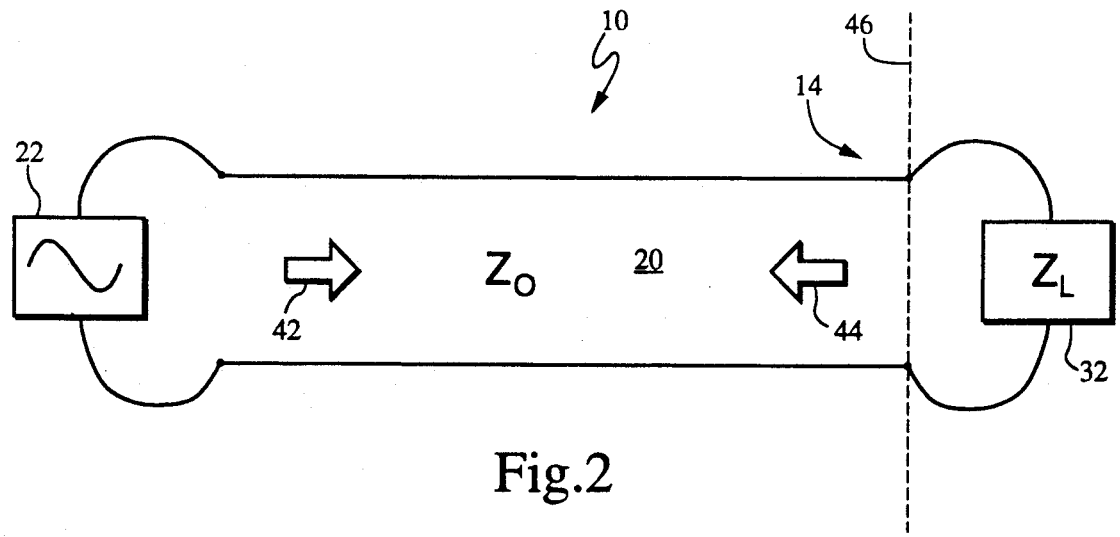
FIG. 2 is an equivalent schematic circuit representing the finite two-conductor transmission line as shown in FIG. 1.

Referring now to FIG. 2, there is shown an equivalent schematic circuit representation for the two-conductor coaxial transmission line shown in FIG. 1. Electromagnetic theory establishes that, for transmission lines 10 of infinite length, electromagnetic waves will propagate solely in the forward direction away from the generating source 22, as generally indicated by arrow 42.

For transmission lines of finite length, on the other hand, termination of the second end 14 of the transmission line 10 creates a boundary 46 that will reflect the forward propagating waves 42 back toward the generating source 22, as generally indicated by arrow 44, generating a contained electromagnetic field. Interaction between the forward propagating and reflected waves, 42 and 44 respectively, within the contained electromagnetic field creates standing waves exhibiting widely varying field strengths throughout the length of the finite transmission line 10.

As is well known, two-conductor transmission lines possess a characteristic impedance ($Z_o$) determined by the characteristic properties of the transmission line itself. Electromagnetic theory predicts, and experimentation has shown, that reflected waves 44 can be substantially if not completely eliminated by terminating the finite transmission line 10 with a load impedance ($Z_l$) 32 equal to the characteristic impedance ($Z_o$) of the transmission line itself. In such situations, the transmission line is said to be "matched" and the forward propagating waves 42 behave as if the transmission line had infinite length (i.e., no boundary reflections or created standing waves).

Although advances in communications technology have provided secondary transceivers that allow for reliable wireless signal transmission at low field strengths, there is a threshold field strength level below which even the most advanced secondary transceivers cannot efficiently communicate. Locations where the field strength along the length of the transmission line 10 falls below the threshold field strength level identify "dead zones" in the communication system. At these locations, secondary transceivers placed within the air dielectric 20 will be unable to communicate over the transmission line 10. Placement of secondary transceivers along the length of transmission line 10 in locations where the field strength level is above the threshold level, will allow for efficient electromagnetic communication.

As is well known, the standing waves generated in a contained electromagnetic field are substantially sinusoidal in shape having a wavelength equal to that of the signal generated by the sinusoidal generator (primary transceiver) 22. A matched load impedance ($Z_l=Z_o$) generates a flat, horizontal standing wave indicating a uniform field strength throughout the length of the transmission line 10. It is only when the terminating load ($Z_l$) 32 does not match the characteristic impedance ($Z_o$) of the transmission line 10 that a standing wave of sinusoidal shape is generated. The swing in field strength along the length of an unmatched transmission line 10 is proportional to the difference between the terminating load impedance ($Z_l$) 32 and the characteristic impedance ($Z_o$). Unmatched lines can create fields with electromagnetic communications dead zones.

Figure 3:
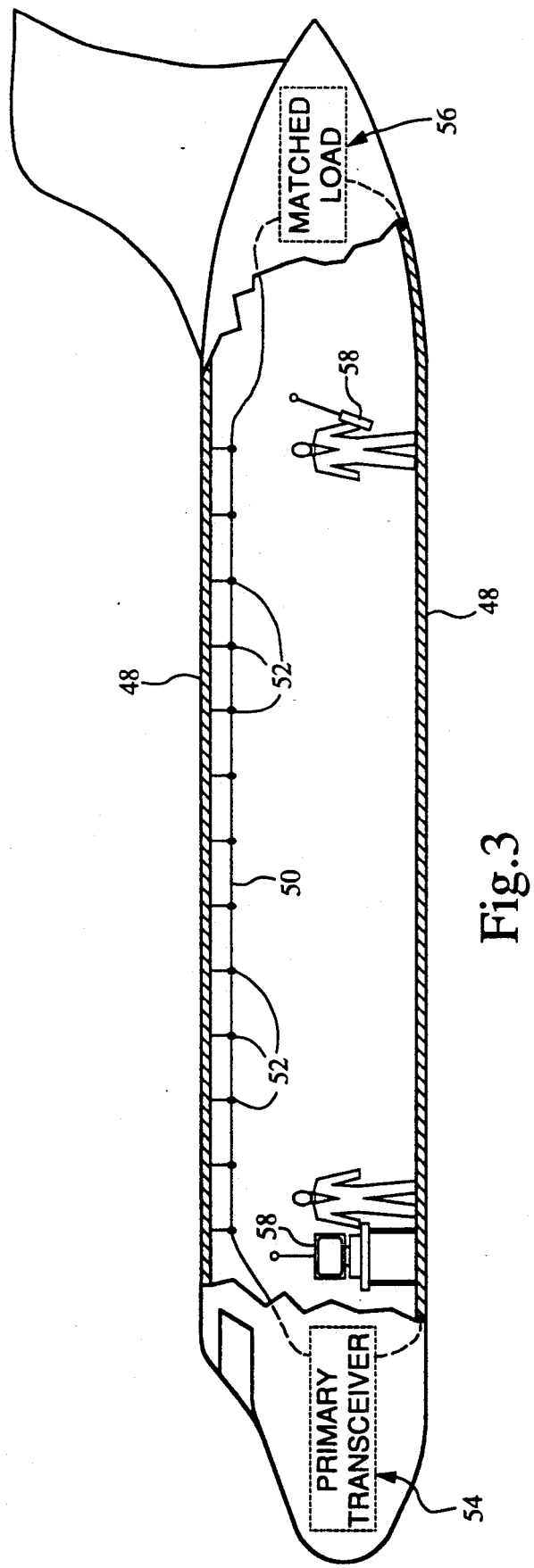
FIG. 3 shows one embodiment of the method of the present invention for providing wireless electromagnetic communications within the enclosed structure of an aircraft fuselage.

Referring now to FIG. 3, there is shown one particular embodiment of the method for wireless electromagnetic communication of the present invention. In this application, an aircraft fuselage 48 acts as the outer conductor (18 in FIGS. 1 and 2) for a two-conductor electromagnetic transmission line communications system. An inner conductor 50 (16 in FIGS. 1 and 2) is suspended and insulated from the fuselage 48 by means of a number of insulating hangers 52. A radio frequency communications source (primary transceiver) 54 (22 in FIGS. 1 and 2) is coupled to one end of the fuselage 48 and inner conductor 50. The other end of the inner conductor 50 and fuselage 48 transmission line is terminated in a matched load impedance 56 (32 in FIGS. 1 and 2).

Use of a matched impedance load 56 creates standing waves having a field strength greater than the threshold level needed for efficient electromagnetic communications throughout the length of aircraft fuselage 48. The irregular shape of the fuselage and the introduction of other materials, for example, human bodies, furnishings, equipment, cause wave reflections that disturb the uniform field anticipated when terminating the transmission line in a matched load. The size of the wave reflections is proportional to the size, conductivity and dielectric constant of each object in comparison to the diameter of the fuselage. Proper matching of the terminating load and insertion of low or non-reflecting materials into the fuselage produces a relatively uniform field strength, without dead zones, and nominal standing waves throughout the fuselage 48. Thus, a plurality of secondary electromagnetic transceivers 58 may be positioned within the contained electromagnetic field to insert or extract radiation from the transmission line and communicate with the primary transceiver 54 or other secondary transceivers 58.

Use of the method for electromagnetic communications of the present invention, obviates the need for costly cabling between system components and reduces the likelihood that electromagnetic wave reflections will interfere with system communications. It will, of course, be understood that the method of the present invention is not limited to use as an intra-aircraft communications system, but may be adapted for use in other confined areas, for example, submarines, ships, railroad cars, and command control and communications centers wherein an enclosing structure may be used as one conductor in a multi-conductor transmission line.

Although a preferred embodiment of the invention has been illustrated in the accompanying Drawings and described in the foregoing Detailed Description, it will be understood that the invention is not limited to the embodiment disclosed but is capable of numerous rearrangements and modifications of parts and elements without departing from the scope of the invention.

I claim:

1. A method for electromagnetic communication within an enclosed conductive vehicle fuselage comprising the steps of:
    disposing a conductive line supported within and insulated from the conductive vehicle fuselage to form a multi-conductor electromagnetic transmission line within the conductive fuselage wherein the conductive structure comprises one conductor of the multi-conductor transmission line and the conductive line comprises another conductor;
    coupling a primary transceiver between the conductive fuselage and the conductive line of said multi-conductor transmission line;
    terminating the multi-conductor transmission line with a matched load impedance coupled between the conductive fuselage and the conductive line; and
    positioning at least one secondary transceiver within the conductive fuselage for communication with the primary transceiver by means of said multi-conductor transmission line.

2. The method of electromagnetic communications as in claim 1 wherein the step of forming a multi-conductor electromagnetic transmission line includes forming a transmission line within an aircraft fuselage.

3. An electromagnetic communication system for transmission and reception of communication signals within a conductive vehicle fuselage, comprising:
    a multi-conductor transmission line wherein the fuselage comprises an outer conductor of said transmission line and wherein said transmission line further includes an inner conductor positioned within an insulated from said fuselage;
    a matched load impedance coupled to the multi-conductor transmission line between the fuselage and the inner conductor;
    first transceiver means coupled to the multi-conductor transmission line between the fuselage and the inner conductor; and
    at least one second transceiver means positioned within the fuselage for communication with the first transceiver means over said multi-conductor transmission line.

4. The electromagnetic communications system as in claim 3 wherein the conductive vehicle fuselage comprises an aircraft fuselage.

5. Apparatus for electromagnetic communication comprising an electrically conductive metallic enclosure and a conducting element insulated from and supported within the metallic enclosure, said metallic enclosure and said conducting element jointly defining a multi-conductor electromagnetic transmission line having a characteristic impedance, a primary radio frequency transceiver connected between the metallic enclosure and said conducting element, a terminating impedance load connected between the metallic enclosure and said conducting element, wherein the impedance of said terminating impedance matches the characteristic impedance of the transmission line, and at least one secondary transceiver positioned within the metallic enclosure for communications over the multi-conductor transmission line with the primary transceiver.

6. The apparatus for electromagnetic communications as in claim 5 wherein the metallic enclosure comprises the metallic enclosure for a transport vehicle.

7. A method for providing radio communications between a primary transceiver and at least one secondary transceiver located within an enclosing metallic structure for a transport vehicle, comprising the steps of:
    disposing a conductor supported within and insulated from the metallic structure of the transport vehicle to form a multi-conductor transmission line comprised of the enclosing metallic structure and the conductor supported and insulated from the structure;
    coupling the primary transceiver between the metallic structure and a first end of said conductor;
    coupling a matched load impedance to the transmission line between the metallic structure and a second end of said conductor; and
    positioning each secondary transceiver within the enclosing metallic structure of the transport vehicle to communicate with the primary transceiver over the transmission line.

8. An electromagnetic communication system for radio frequency communications between a primary transceiver and at least one secondary transceiver positioned within a metallic structure for a transport vehicle, comprising:
    a multi-conductor electromagnetic transmission line, the metallic structure of the transport vehicle comprising a first conductor of said transmission line, and wherein said transmission line further includes a second conductor positioned within and insulated from the metallic structure;
    a matched load impedance connected between the metallic structure and the second conductor;
    means for connecting the primary transceiver between the metallic structure and the second conductor, whereby the primary transceiver and each secondary transceiver positioned within the transport vehicle communicate by means of the multi-conductor transmission line.

9. The electromagnetic communications systems as in claim 8 wherein in response to an electromagnetic wave generated by the primary transceiver, the multi-conductor transmission line and the matched load impedance propagates an electromagnetic field which is contained within the metallic structure.

10. The electromagnetic communications systems as in claim 9 wherein the contained electromagnetic field has a substantially uniform field strength.

11. The electromagnetic communications systems as in claim 9 wherein the contained electromagnetic field generated within the metallic structure has a substantially minimal standing wave ratio.

12. The electromagnetic communications system as in claim 8 wherein the metallic structure comprises a fuselage and the transport vehicle comprises an aircraft.

* * * * *